US010915165B2

(12) United States Patent
Lusinchi (10) Patent No.: US 10,915,165 B2
(45) Date of Patent: Feb. 9, 2021

(54) METHODS AND SYSTEMS FOR CONTROLLING A DISPLACEMENT OF A VIRTUAL POINT OF VIEW IN A VIRTUAL REALITY ENVIRONMENT

(71) Applicant: Emmanuel Lusinchi, Singapore (SG)

(72) Inventor: Emmanuel Lusinchi, Singapore (SG)

( * ) Notice: Subject to any disclaimer, the term of this patent is extended or adjusted under 35 U.S.C. 154(b) by 246 days.

(21) Appl. No.: 16/084,147

(22) PCT Filed: Jul. 29, 2016

(86) PCT No.: PCT/SG2016/050369
§ 371 (c)(1),
(2) Date: Sep. 11, 2018

(87) PCT Pub. No.: WO2018/021962
PCT Pub. Date: Feb. 1, 2018

(65) Prior Publication Data
US 2020/0293106 A1    Sep. 17, 2020

(51) Int. Cl.
*G06F 3/01* (2006.01)
*G02B 27/00* (2006.01)
*G02B 27/01* (2006.01)

(52) U.S. Cl.
CPC ......... *G06F 3/012* (2013.01); *G02B 27/0093* (2013.01); *G02B 27/0101* (2013.01); *G02B 27/0172* (2013.01); *G02B 27/0179* (2013.01); *G02B 2027/0123* (2013.01); *G02B 2027/0187* (2013.01)

(58) Field of Classification Search
CPC ..... G06T 19/003; G06T 19/006; G06F 3/011; G06F 3/012; A63F 2300/8082
See application file for complete search history.

(56) References Cited

U.S. PATENT DOCUMENTS

| 4,930,435 A | 6/1990 | Newman |
| 9,056,240 B2 | 6/2015 | Carrell |
| 9,239,616 B1 | 1/2016 | Carrell |
| 9,329,681 B2 | 5/2016 | Goetgeluk |
| 9,459,692 B1 * | 10/2016 | Li ........................... G02B 27/01 |
| 2004/0201857 A1 * | 10/2004 | Foxlin .................. G02B 27/017 356/620 |

(Continued)

OTHER PUBLICATIONS

Sam Tregillus and Eelke Folmer, VR-STEP: Walking-in-Place using Inertial Sensing for Hands Free Navigation in Mobile VR Environments, May 2016, In Proceedings of the 2016 CHI Conference on Human Factors in Computing Systems, pp. 1250-1255. (Year: 2016).*

(Continued)

*Primary Examiner* — Jeffery A Brier
(74) *Attorney, Agent, or Firm* — Ladas & Parry, LLP (57) ABSTRACT

A method of controlling the displacement of a virtual point of view of a user in a virtual reality environment comprises, with a virtual reality headgear, providing a user with a virtual point of view in a virtual reality environment. The virtual point of view is displaced in response to a change of position of the head of the user. An acceleration of the inner ear of the user in a first direction is detected and if said detected acceleration of the inner ear of the user has an absolute value above a predetermined threshold, said virtual point of view of said user is additionally displaced in a second direction.

22 Claims, 6 Drawing Sheets

(56) References Cited

U.S. PATENT DOCUMENTS

| | | | |
|---|---|---|---|
| 2010/0279770 A1* | 11/2010 | Ikeda | A63F 13/211 463/32 |
| 2011/0282130 A1 | 11/2011 | Krueger | |
| 2013/0293688 A1 | 11/2013 | Benson et al. | |
| 2013/0322844 A1* | 12/2013 | Suzuki | G06F 3/04815 386/230 |
| 2014/0303687 A1 | 10/2014 | Wall et al. | |
| 2015/0193983 A1 | 7/2015 | Katz et al. | |
| 2015/0268473 A1* | 9/2015 | Yajima | G02B 27/0172 345/633 |

OTHER PUBLICATIONS

James N. Templeman, Patricia S. Denbrook, and Linda E. Sibert, Virtual Locomotion: Walking in Place through Virtual Environments, Dec. 1999, Presence, vol. 8, No. 6, pp. 598-617. (Year: 1999).*

International Search Report for PCT/SG2016/050369 dated Nov. 17, 2016.

Written Opinion of the International Search Authority PCT/SG2016/050369 dated Nov. 17, 2016.

* cited by examiner

METHODS AND SYSTEMS FOR CONTROLLING A DISPLACEMENT OF A VIRTUAL POINT OF VIEW IN A VIRTUAL REALITY ENVIRONMENT

CROSS-REFERENCE TO RELATED APPLICATION

The present application is the U.S. National Phase of PCT/SG2016/050369 filed on Jul. 29, 2016 which is incorporated herein by reference in its entirety.

TECHNICAL FIELD

The present disclosure relates to the field of virtual reality, and in particular to controlling the displacement of the virtual point of view of a user in a virtual reality environment.

BACKGROUND

A virtual reality system is an advanced computer system that stores data about a virtual scenery, and displays to a user what said user would see if the user were at a given position in said virtual scenery.

Figure 1:
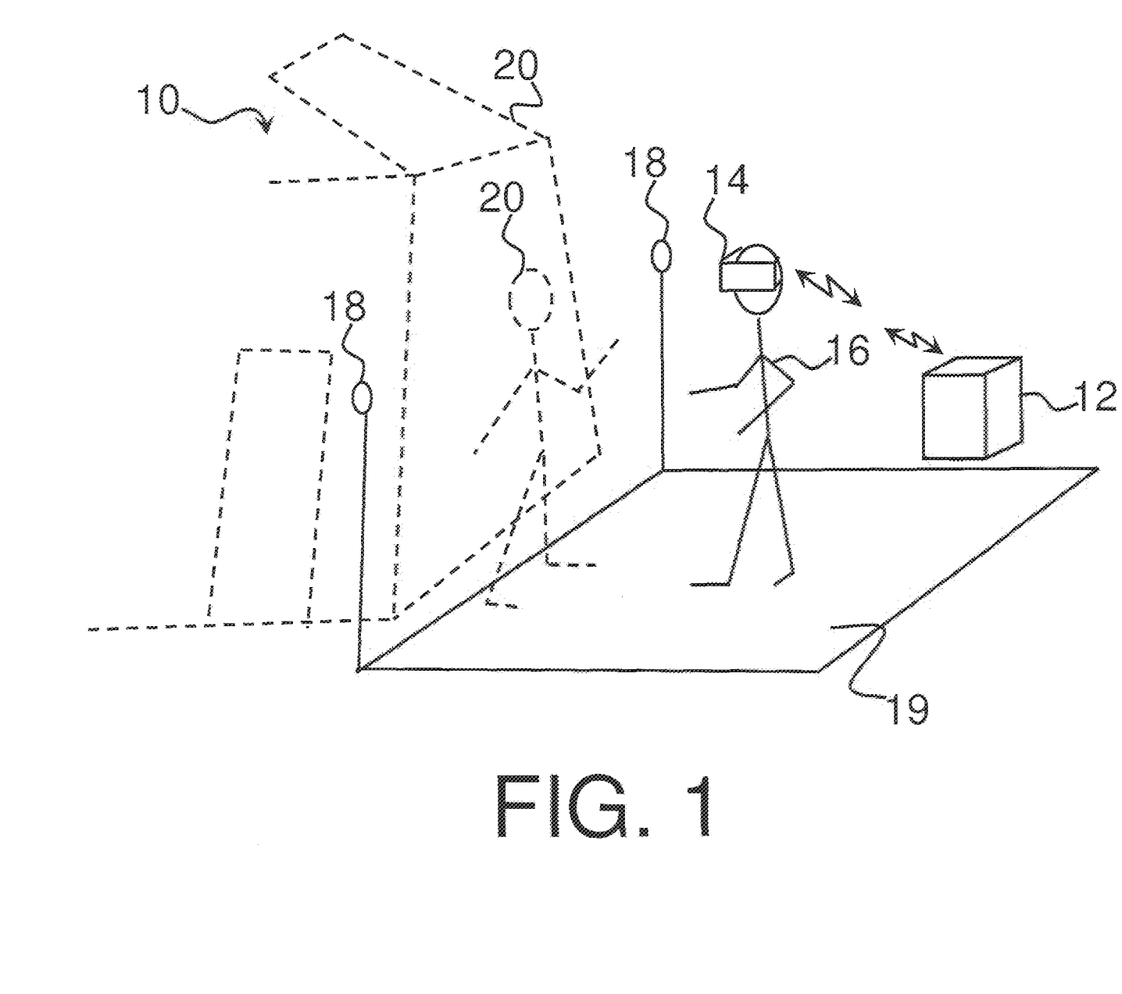
FIG. 1 illustrates schematically a virtual reality system

FIG. 1 illustrates schematically a virtual reality system 10 comprising a computer 12 that stores data about a virtual scenery, and a headgear 14 that displays to a user 16 wearing said headgear 14 what said user would see if the user were at a given position in said virtual scenery. The headgear 14 can communicate wirelessly with the computer 12, as illustrated, or communicate through one or several wires or can integrate the computer itself. The headgear 14 comprises a stereoscopic display so as to display stereoscopic images to the eyes of the user 16. The system 10 comprises a plurality of sensors for determining the position and orientation of the headgear 14 and consequently the eyes of user 16. The position of the headgear is measured with respect to one or more reference points. Some sensors, such as distance sensors 18, can be arranged at calibrated positions of a play area 19 made available to the user and supply some positional information to computer 12. Some sensors, such as accelerometers and magnetometers can be arranged in the headgear 14 and help determine the orientation of the headgear, for example with respect to a referential related to said play area. In other settings, some of the sensors are mounted on the headgear itself, looking out at the environment to help determine its position and its changes in position.

The system 10 is arranged to display to user 16 stereoscopic image data 20 showing what the user would see if the user eyes were at a given position in the virtual scenery stored in computer 12. The position of the user eyes in the virtual scenery is commonly named the virtual point of view of the user in the virtual scenery. When the user moves his head by a certain amount, the system 10 adjusts the stereoscopic data displayed to user 16 as if the user's virtual point of view had been displaced by a corresponding amount in the virtual scenery.

A drawback of virtual reality systems such as schematized in FIG. 1 is that the user's physical displacements are limited to the physical boundaries of the play area 19. This limits greatly the size of the virtual sceneries the user can interact with.

Figure 2A:
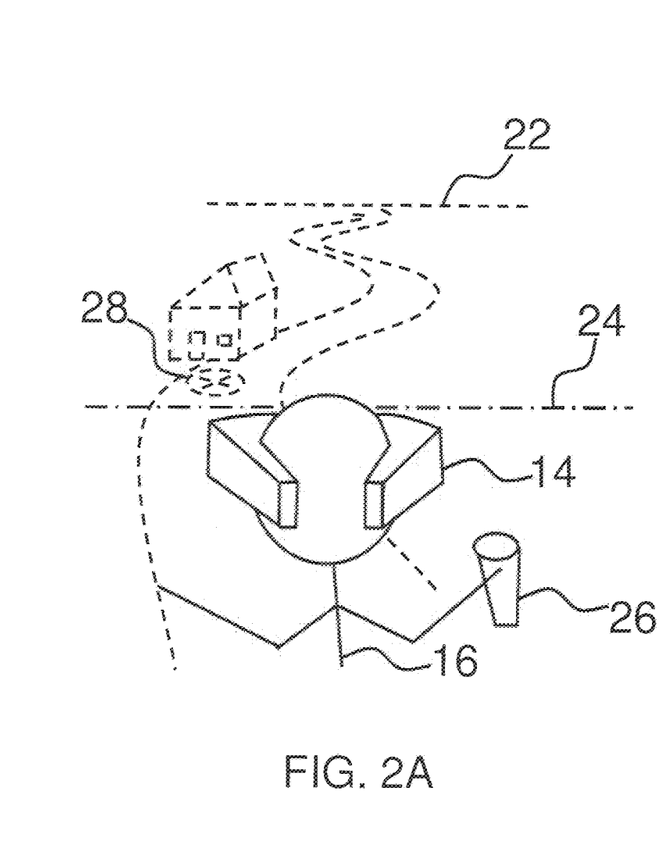
FIG. 2 illustrates schematically a displacement in a virtual reality system.

FIG. 2A illustrates a known solution for allowing user 16 to displace the user's virtual point of view in a virtual scenery 22 larger than the play area 19 of user 16. The system 10 displays a boundary 24, such as a transparent colored wall, that marks an explorable area around the virtual point of view of user 16 in the virtual scenery 22, which fits into the physical dimensions of the play area 19. As outlined above, user 16 can move freely within the explorable area having boundary 24, because the boundary 24 corresponds to the play area 19 where the user can move. To allow user 16 to go beyond the boundary 24, system 10 comprises a user interface 26 that communicates with the computer 12. User interface 26 can comprise a joystick-like control apparatus that can be actuated along X and Y axis to send to the computer 12 instructions to displace the virtual point of view of the user along X and Y axis in the virtual scenery 22.

A known drawback however is that most users rapidly develop a discomfort akin to motion sickness when their virtual point of view is displaced in response to the control signals from a joystick-like control apparatus.

A known alternative solution that does not make the users sick is called the "teleportation" solution. The teleportation solution comprises using a joystick-like interface 26 to move a virtual marker 28 in scenery 22. The position of virtual marker 28 has no influence on the position of the user's virtual point of view until for example a button is actuated on interface 26. Then, when the button is actuated, the user's virtual point of view is instantly displaced in virtual scenery 22 (or "teleported") to the vertical (e.g. at eye's height) of where virtual marker 28 was before the button was pressed.

Figure 2B:
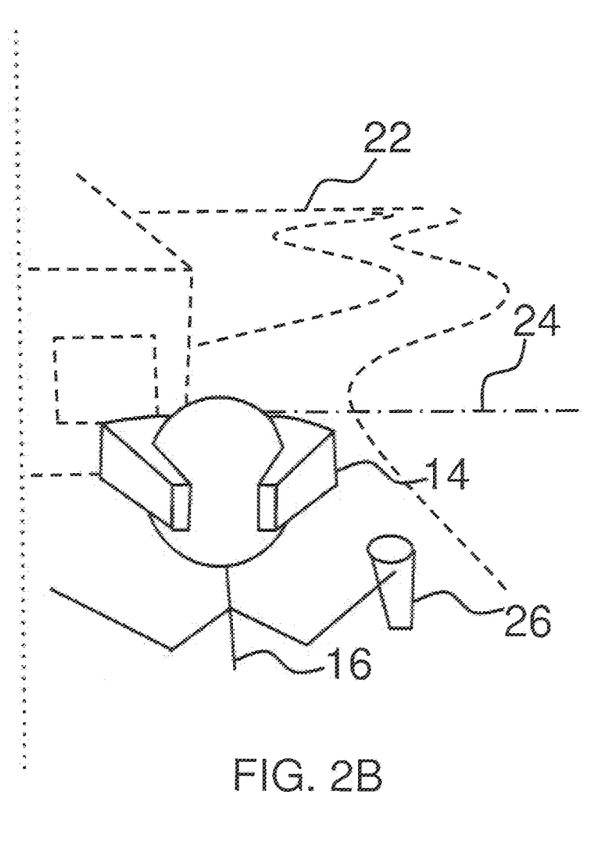

FIG. 2B illustrates schematically what user 16 views of scenery 22 after user 22 was "teleported" to the position of the marker 28 shown in FIG. 2A. The position of boundary 24 is updated in the displayed scenery 22 with respect to the new position of the virtual point of view of user 16 in scenery 22. If the teleportation solution prevents motion sickness in user 16, it has the drawback of not providing a realistic way of depicting a displacement in scenery 22, to the detriment of the user's experience of virtual reality.

Other systems, such as disclosed in U.S. Pat. Nos. 9,239,616, 9,056,240 and 9,329,681, rely on a smooth surface and special shoes with a smooth sole and attached sensors. Such a system tracks the feet of the user as they glide over a smooth pedestal they stand on. The drawback of such a solution is the reliance on a bulky piece of equipment to provide the necessarily smooth surface and the inconvenience of putting special shoes on.

There exists a need for a method of controlling the displacement of a virtual point of view of a user in a virtual reality environment that does not cause motion sickness of the user, feels more realistic to the user than teleportation and doesn't rely on a bulky equipment and specialized footwear.

SUMMARY

A method according to an embodiment of the present disclosure provides for, in addition to the displacements of the user's point of view that derive from changes of the position of the head of the user (generally measured as change of the position of a headgear worn by the user), displacing the point of view of the user in a predetermined direction, for example a horizontal direction facing the point of view of the user, in response to detecting accelerations of the inner ear of the user above a predetermined value.

An embodiment of the present disclosure comprises a method of controlling the displacement of a virtual point of view of a user in a virtual reality environment, the method comprising: with a virtual reality headgear, providing a user with a virtual point of view in a virtual reality environment and displacing said virtual point of view in response to a change of position of the head of the user; the method further comprising: detecting an acceleration of the inner ear of the user in a first direction; and if said detected acceleration of the inner ear of the user has an absolute value above a predetermined threshold, additionally displacing said virtual point of view of said user in a second direction.

According to an embodiment of the present disclosure, said detecting an acceleration of the inner ear of the user in a first direction comprises periodically generating samples of an acceleration of the inner ear of the user in said first direction; and said additionally displacing said virtual point of view of said user in a second direction comprises, for each sample having an absolute value above said predetermined threshold, additionally displacing said virtual point of view in said second direction in a time equal to the sampling period by a displacement proportional to the absolute value of the sample.

According to an embodiment of the present disclosure, the sampling period is of 1/30th of a second or less.

According to an embodiment of the present disclosure, the sampling period varies in time and said displacement proportional to the absolute value of the sample by which the virtual point of view of said user is displaced in said virtual reality environment is weighted proportionally to the sampling period.

According to an embodiment of the present disclosure, the method comprises ignoring the accelerations of the inner ear of the user in said first direction if the head of the user is below a predetermined height.

According to an embodiment of the present disclosure, said first direction is vertical and said second direction is a horizontal direction faced by the user in said virtual reality environment.

According to an embodiment of the present disclosure, the method comprises measuring said accelerations of the inner ear of the user in said first direction with a vertical acceleration sensor in said headgear.

According to an embodiment of the present disclosure, said acceleration of the inner ear of the user in a first direction is a rotational acceleration of the inner ear around a vertical axis; and said second direction is a horizontal direction faced by the user in said virtual reality environment.

According to an embodiment of the present disclosure, the method comprises measuring said accelerations of the inner ear of the user in said first direction with a rotational acceleration sensor attached to the torso of the user.

According to an embodiment of the present disclosure, the method comprises triggering the playing of an audio signal at the beginning of each displacement of said virtual point of view of said user in said virtual reality environment.

An embodiment of the present disclosure relates to a virtual reality user interface comprising: a virtual reality headgear, arranged for providing a user with a virtual point of view in a virtual reality environment and for displacing said virtual point of view in response to a change of position of the head of the user; a sensor for detecting a vertical acceleration of the headgear; and a processor arranged for additionally displacing said virtual point of view of said user in a horizontal direction facing the virtual point of view if said detected vertical acceleration of the headgear has an absolute value above a predetermined threshold.

According to an embodiment of the present disclosure, said processor periodically generates samples of said vertical acceleration detected by the sensor; and additionally displaces said virtual point of view of said user in said horizontal direction by, for each sample having an absolute value above said predetermined threshold, additionally displacing said virtual point of view in said horizontal direction in a time equal to the sampling period by a displacement proportional to said absolute value.

According to an embodiment of the present disclosure, the sampling period varies in time and said displacement proportional to said absolute value is further weighted proportionally to the sampling period.

According to an embodiment of the present disclosure, the processor is arranged for triggering the playing of an audio signal if said detected vertical acceleration of the headgear has an absolute value above said predetermined threshold.

According to an embodiment of the present disclosure, the processor is arranged for ignoring the vertical accelerations of the headgear if the head of the user is below a predetermined height.

According to an embodiment of the present disclosure, the processor is arranged for capping the absolute value of the detected vertical acceleration of the headgear to a predetermined maximum.

An embodiment of the present disclosure relates to a virtual reality user interface comprising: a virtual reality headgear, arranged for providing a user with a virtual point of view in a virtual reality environment and for displacing said virtual point of view in response to a change of position of the head of the user; a sensor for detecting a rotational acceleration of the torso of the user; and a processor arranged for additionally displacing said virtual point of view of said user in a horizontal direction facing the virtual point of view if said detected rotational acceleration of the torso of the user has an absolute value above a predetermined threshold.

According to an embodiment of the present disclosure, said processor periodically generates samples of said rotational acceleration detected by the sensor; and additionally displaces said virtual point of view of said user in said horizontal direction by, for each sample having an absolute value above said predetermined threshold, additionally displacing said virtual point of view in said horizontal direction in a time equal to the sampling period by a displacement proportional to said absolute value.

According to an embodiment of the present disclosure, the sampling period varies in time and said displacement proportional to said absolute value is further weighted proportionally to the sampling period.

According to an embodiment of the present disclosure, the processor is arranged for triggering the playing of an audio signal if said detected rotational acceleration of the torso has an absolute value above said predetermined threshold.

According to an embodiment of the present disclosure, the processor is arranged for ignoring the rotational accelerations of the torso if the head of the user is below a predetermined height.

According to an embodiment of the present disclosure, the processor is arranged for capping the absolute value of the detected rotational acceleration of the torso to a predetermined maximum.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 3:
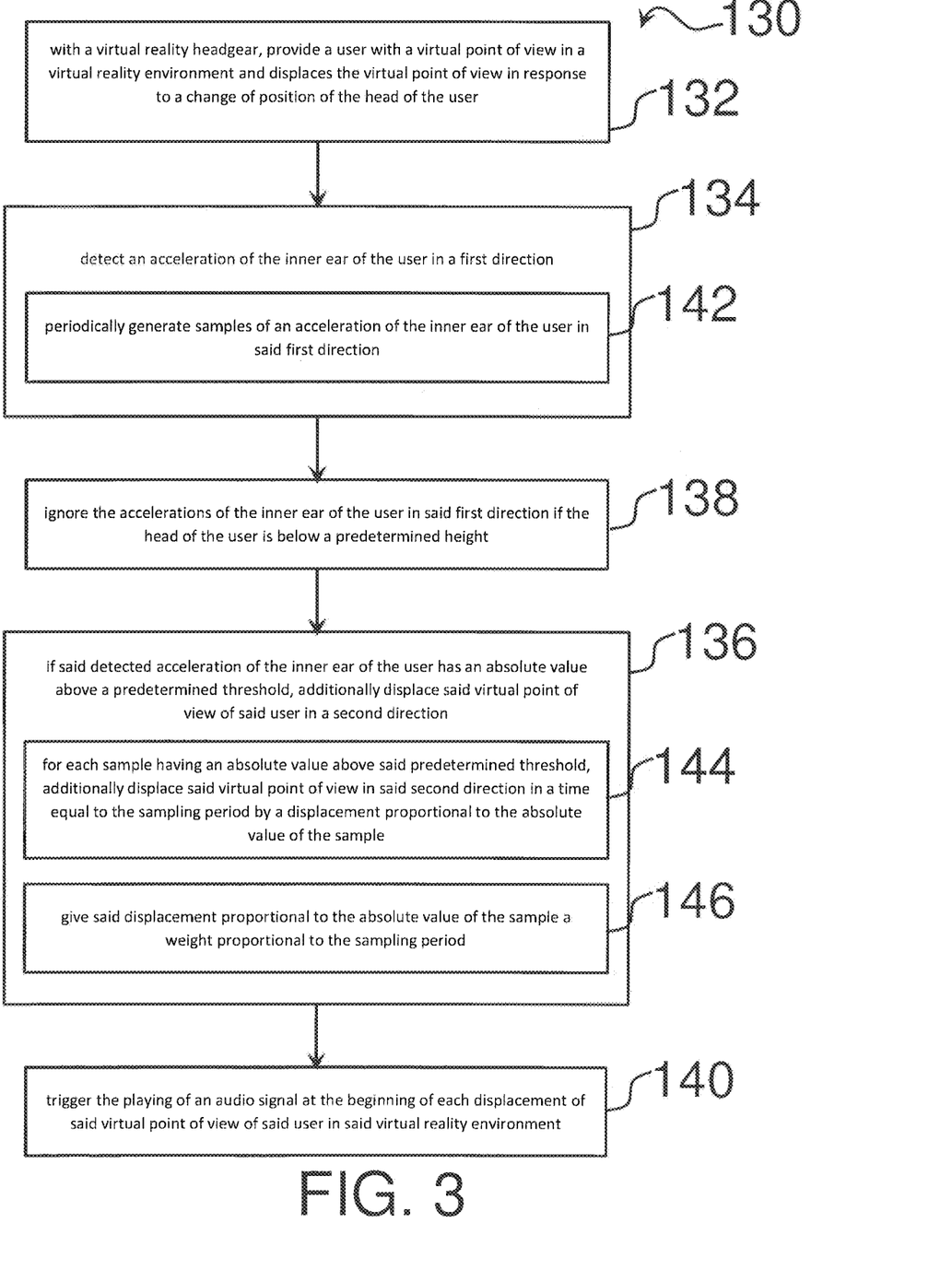
FIG. 3 illustrates a method of controlling a displacement of a virtual point of view according to an embodiment of the present disclosure.

As illustrated in FIG. 3, an embodiment of the present disclosure provides a method 130 of controlling the displacement of a virtual point of view of a user in a virtual reality environment, the method comprising: with a virtual reality headgear, providing 132 a user with a virtual point of view in a virtual reality environment; and displacing 132 said virtual point of view in response to a change of position of the head of the user; detecting 134 an acceleration of the inner ear of the user in a first direction; and if said detected acceleration of the inner ear of the user has an absolute value above a predetermined threshold, additionally displacing 136 said virtual point of view of said user in a second direction. The displacing 136 of the user's virtual point of view in response to the detection of an acceleration above the predetermined threshold is preferably made rapidly enough for the user to feel that the acceleration of the user's inner ear and the displacement of the user's virtual point of view are simultaneous. As detailed hereafter, the first direction can be any direction as long as an acceleration in the first direction indicates that the inner ear of the user gets accelerated, and the second direction can be a direction faced by the virtual point of view of the user and parallel to the ground on which the user stands in the virtual scenery, for example a horizontal direction if the virtual ground is horizontal. Thus, according to an embodiment of the present disclosure, the additional displacements of the user's point of view in response to detecting some accelerations of the user's inner ear give the user the illusion that he is actually "walking" straight ahead in the virtual scenery. The inventor has discovered that displacing the virtual point of view of a user as a result of motions that result in an acceleration of the inner ear of the user lures the brain of the user into believing that the user is actually walking and seeing the scenery change as a result of the walking, and thus suppresses the motion sickness that otherwise appears with a displacement of point of view.

According to an embodiment of the present disclosure, the time lag between detecting the acceleration of the user's inner ear and moving of the user's virtual point of view is shorter than $1/25^{th}$ of a second, or shorter than $1/30$th of a second.

According to an embodiment of the present disclosure, detecting an acceleration of the inner ear of the user in a first direction can comprise detecting an acceleration of the head of the user; for example a vertical acceleration of the head of the user. According to an embodiment of the present disclosure, the vertical acceleration that is detected can be negative or positive. According to an embodiment of the present disclosure, the vertical acceleration that is detected can be the amount of vertical acceleration of the head of the user when the user is standing and alternatively strikes each foot on the ground (walks on the spot without advancing). According to an embodiment of the present disclosure, said predetermined threshold is chosen such that smaller vertical accelerations having an absolute value below said predetermined threshold, such as those resulting from the user moving the head without "walking on the spot" or from sensor noises in the sensor, are ignored.

According to an embodiment of the present disclosure, said predetermined threshold is chosen such that the vertical accelerations resulting from the user actually walking softly are ignored. As outlined above, the virtual reality headgear is provided for displacing the virtual point of view of the user in response to changes of position of the head of the user. The inventor has discovered that such changes of position generate small accelerations of the inner ear of the user, which have an absolute value lower than the absolute value of the accelerations of the inner ear that will result from the user purposefully doing a specific type of movement, such as for example "walking on the spot".

According to an embodiment of the present disclosure, the predetermined threshold beyond which an acceleration of the inner ear is taken in account to generate an additional displacement of the user's point of view can be obtained by calibration: by first instructing the user to make a number of moves and displacements within the play area, so as to make sure that no acceleration of the inner ear generated by such moves is taken in account, then by instructing the user to make a predetermined type of moves (such as for example repeatedly stamping one's foot, or walking on the spot) to make sure that the accelerations of the inner ear generated by such moves are taken in account. This process also allows the user to get accustomed to what predetermined type of moves triggers additional displacement according to embodiments of the present disclosure.

According to an embodiment of the present disclosure, because only the accelerations of the inner ear of the user that are beyond the predetermined threshold trigger an additional displacement, where other acceleration such as those due to moves of the user within the play area only trigger a displacement of the point of view in response to changes of position of the user in the play area, the user can for example move sideways while walking on the spot, which will cause the virtual point of view of the user to at the same time be displaced sideways due to the sideway change of position of the user in the play area, and be additionally displaced forward, as if the user were walking forward with a sideways drift in the virtual scenery. On another hand, when the user stops doing the predetermined motion that triggers the additional displacement and reverts to normal motion within the play area, the system according to an embodiment of the present disclosure ceases to additionally displace the virtual point of view of the user, and seamlessly reverts to displacing the virtual point of view of the user only in response to changes in position of the user within the play area, thus enhancing the experience of the user.

According to an embodiment of the present invention, the direction in which the virtual point of view is additionally displaced can be a function of a change of position immediately before the additional displacement is triggered. For example, if the user takes a step forward in the play area before walking on the spot, the additional displacement resulting from the walking on the spot can be a forward displacement; whereas if the user takes a step backward in the play area before walking on the spot, the additional displacement resulting from the walking on the spot can be a backward displacement.

According to an embodiment of the present disclosure, accelerations of the inner ear that would otherwise be detected are ignored 138 if the head of the user is equal to or lower than a predetermined height. This predetermined height is preferably set around the height of the head of the user when the user is sitting on a chair or crouching, and the feature allows a user to stand up or sit briskly without triggering an unwanted displacement of his point of view.

According to an embodiment of the present disclosure, larger vertical accelerations beyond a set threshold, such as those resulting from the user taking off the headgear, are capped to a maximum value so that they do not result in moving the virtual point of view in an unbound way.

Figure 4:
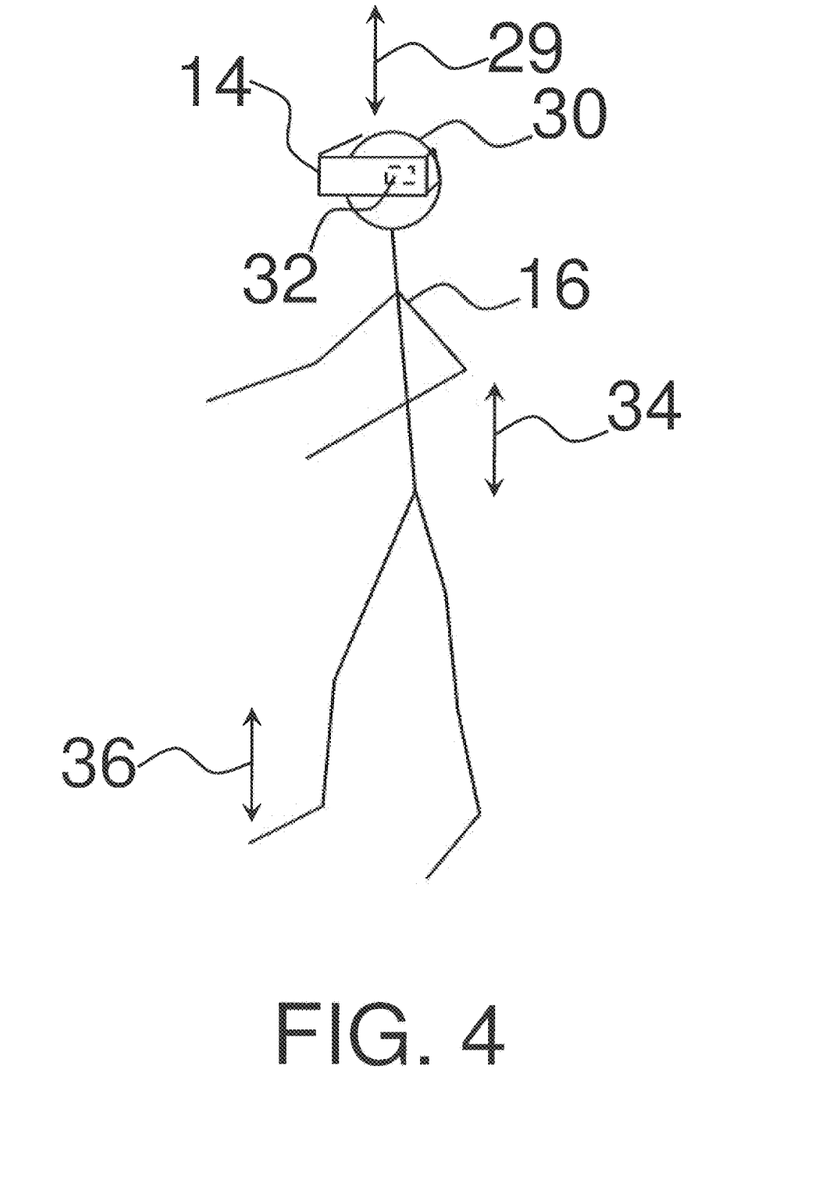
FIG. 4 illustrates schematically a detection of an acceleration of the inner ear of a user according to an embodiment of the present disclosure.

As illustrated in FIG. 4, according to an embodiment of the present disclosure, detecting a vertical acceleration 29 of the head 30 of user 16 can be done using an acceleration sensor 32 attached to the head of the user; for example attached to the virtual reality headgear 14 of the user 16. A number of known virtual reality headgears are provided with at least one acceleration sensor. An embodiment of the present invention provides for modifying the calculator of such known headgears to output a dedicated vertical acceleration signal that can be sent to a dedicated processor, which generates a dedicated control signal for changing the position of the virtual point of view of the user in a predetermined direction in response to the dedicated vertical acceleration signal. The dedicated processor can be in the headgear 14 or in computer 12. According to an embodiment of the present disclosure the processor and the calculator can be calibrated for detecting a sufficient vertical acceleration 29 of the head of the user 16, which results from the spine of the user being vertically accelerated 34, which results from the user physically taking a step 36 walking "on the spot" and is beyond the predetermined threshold, and in response to the detection of such a sufficient vertical acceleration, additionally displacing a pending position of the virtual point of view of the user in e.g. the horizontal direction faced by the user in the virtual scenery. It is noted that if the position of the user (or the position of the user's head) with respect to the play area does not change while the user is "walking on the spot", the additional displacement made in response to the detection of a sufficient acceleration of the inner ear is actually the only displacement of the virtual point of view.

As detailed hereafter, the additional displacement can be proportional to the magnitude of the detected vertical acceleration. As detailed hereafter, this process can be repeated (for example at a frequency of 30 Hertz or more) and according to an embodiment of the present disclosure, this effectively translates a single step (walking on the spot) of the user into a series of small successive displacements in the virtual scene that together aggregate into the visual perception of a smooth and believable virtual step forward. This effectively synchronizes a physical motion 36 perceived as a "step" by the inner ear of the user 16 with a "step" displacement in virtual reality. The inventor has discovered that the synchronization of a physical motion perceived as a "step" by the inner ear of the user with a series of small successive displacements forming a "step" displacement in virtual reality completely suppresses the discomfort and motion sickness of most users when the users "walk" in the virtual reality environment.

According to an embodiment of the disclosure, the virtual scenery does not have to be horizontal. If the virtual scenery is horizontal, when the user steps onto the real ground (when a sufficient acceleration of the user's inner ear is detected), the virtual point of view is displaced horizontally, for example in the direction of the virtual point of view projected onto the horizontal plane.

On another hand, if the virtual scenery is not horizontal, when the user steps onto the real ground the virtual point of view is displaced as a combination of a horizontal and a vertical displacement so that the virtual point of view is additionally displaced parallelly to the ground in the virtual scenery. In a virtual reality system that tracks the position of the user relative to his real environment, the head-to-ground distance in the virtual environment is kept equal to that of the head-to-ground distance detected in the real environment. This results in most users being able to naturally navigate non-flat environments, such as natural terrains, hills, ramps, stairs, etc. without discomfort.

According to an embodiment of the disclosure, because the additional displacement made in response to detecting a sufficient acceleration of the inner ear is added to any displacement due to a change in position of the head of the user with respect to the play area, even if the user looks up or down while walking in place, and thus has a virtual point of view that makes an angle with respect to the horizontal plane, when the user makes a step motion that triggers an additional displacement, the spatial orientation of the virtual point of view of the user is kept equal to the spatial orientation of the read head of the user. This allows the user to, for example, naturally look down while "virtually walking" down stairs or look up while "virtually walking" up a slope.

According to an embodiment of the present disclosure, if the user's gear allows determining the direction faced by the torso of the user, the direction in which the virtual point of view is displaced in response to a detection of a sufficient acceleration of the inner ear of the user can be a direction parallel to the ground in the virtual scenery, and faced by the torso of the user.

According to an embodiment of the present disclosure, a higher frequency of vertical accelerations will result in more frequent virtual displacements or steps. This effectively allows the user to naturally "jog" and "run" in the virtual reality scenery, and desirably enhances the virtual reality experience of the user.

According to an embodiment of the present disclosure, the length of a stride (i.e. the value of the additional displacements) can be modulated as a function of the texture of the ground displayed in the virtual scenery directly underneath the head of the user in the virtual environment. For example, if the user is traversing in the virtual scenery a patch of deep snow or mud, the strides of the user in the virtual scenery can be reduced by an amount related to the "depth" of the snow or characteristic of the mud displayed.

As illustrated in FIG. 3, according to an embodiment of the present disclosure, an audio signal such as the sound of a footfall, for example having a predetermined duration that can be perceived as the duration of the noise made by a real footfall, can be output 140 to the user, for example by speakers in the headgear 14, in synchronism with for example the beginning of each series of successive additional displacements of the point of view of the user. Different sounds of footfall can be selected as a function of the texture of the ground present directly underneath the head of the user in the virtual scenery. For example, if the virtual scenery displayed to the user is deep snow or mud, the sound associated to each footfall can be the sound of a foot crushing snow or getting in and out of mud. The sound that is played can be further modulated or selected based on the magnitude of the detected vertical acceleration of the user's inner ear, with more vigorous "jogging in place" resulting in louder and more forceful footfall sounds while gentler steps can result in a fainter sound.

A number of known virtual reality headgears are provided with position sensors that allow determining in real time the position of the head 30 of user 16 in a physical referential having a known position and orientation with respect to the play area. According to an embodiment of the present disclosure, detecting a vertical acceleration 29 of the head 30 can be done by detecting a change in time of the position of the head 30 of the user 16, calculating the speed of the motion of the head 30, and calculating the derivative of the calculated speed to obtain the acceleration of the head 30.

Some known virtual reality headgears are provided with sensors that output speed vectors of the head 30 in the referential. The vertical acceleration of the head is then calculated as the derivative of the vertical speed vector.

The embodiments above have been described in relation with sensors attached to the head, and in particular to a headgear worn by the user. However, sensors can be attached to other parts of the body as long as they allow detecting an acceleration of a portion of the body of the user that translates into an acceleration of the inner ear of the user. For example, a vertical acceleration sensor can be attached to the torso of the user, as a vertical acceleration of the torso of a first value naturally translates into a vertical acceleration of a second value of the inner ear of the user.

Figure 5:
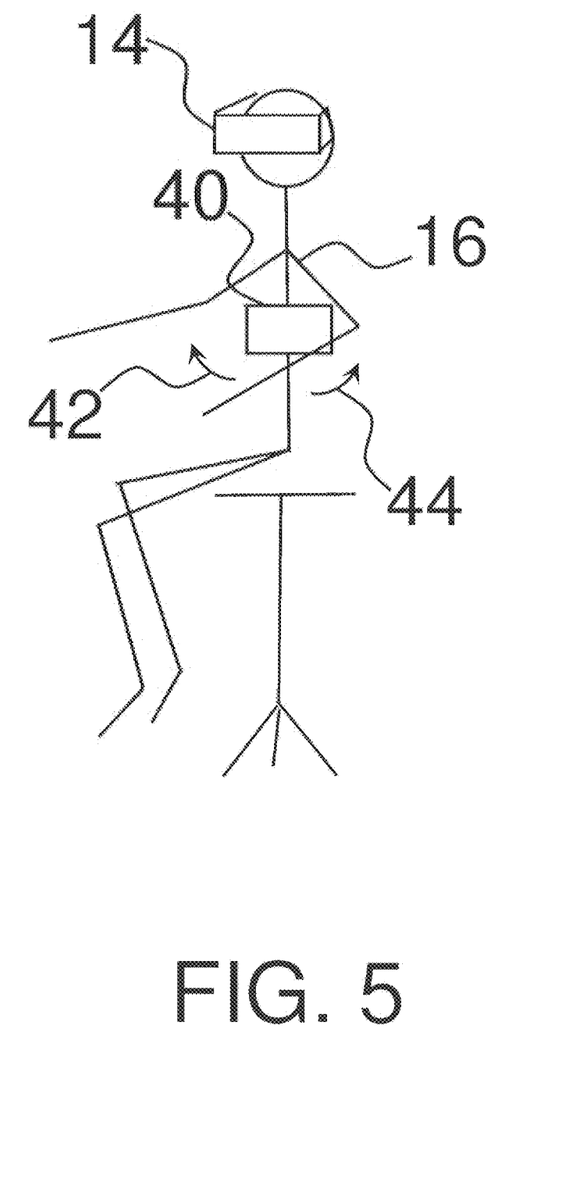
FIG. 5 illustrates schematically a detection of an acceleration of the inner ear of a user according to an embodiment of the present disclosure.

FIG. 5 illustrates an embodiment of the present disclosure where an acceleration sensor 40 is attached to the torso of user 16 and arranged to detect a rotational acceleration 42, 44 in an axial rotation of the torso of the user 16 (i.e. an acceleration of the torso in rotation around a vertical axis generally aligned with the spine of the user). A rotational acceleration of the torso of a first value translates into a rotational acceleration of a second value of the head and the inner ear of user ear. According to this embodiment of the disclosure, the calculator and processor can be calibrated for, upon detection of a sufficient (above a predetermined threshold) rotational acceleration of the torso corresponding to a rotational motion of the torso, displace the virtual point of view of the user proportionally to the absolute value of the detected acceleration, for example in a direction parallel to the ground of the virtual scenery and faced by the virtual point of view in the virtual scenery displayed to user 16 by headgear 14. According to this embodiment of the disclosure, the detected accelerations can be capped to a predetermined value, as outlined previously.

Figure 6A:
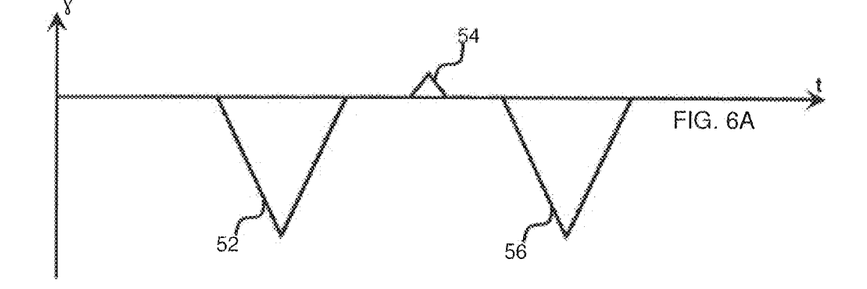
FIGS. 6A-D illustrate a detection of an acceleration of a user's inner ear according to an embodiment of the present disclosure.

FIGS. 6A-D illustrate a detection of a sufficient acceleration of a user's inner ear according to an embodiment of the present disclosure, where FIG. 6A illustrates the signal value received by a sensor of vertical acceleration according to an embodiment of the present disclosure, showing a first negative acceleration 52 such as caused by the user stepping on the ground while walking on the spot. FIG. 6A also shows an exemplary vertical acceleration 54, such as caused by the user looking up, and a second negative step acceleration 56.

Figure 6B:
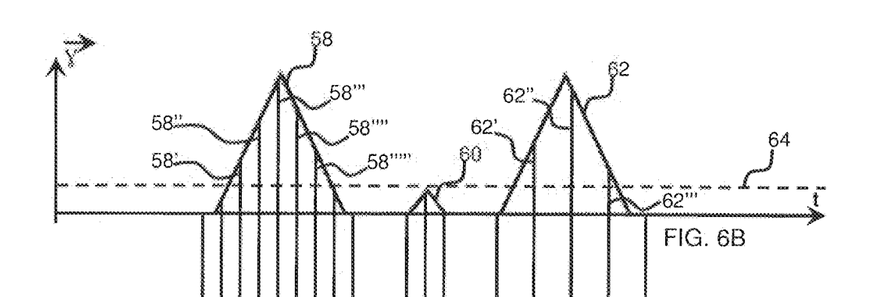

FIG. 6B shows the absolute values 58, 60 and 62 of the accelerations 52, 54 and 56, respectively. According to an embodiment of the present disclosure, the absolute values of the accelerations can be normalized, to allow a standardized calculator operate with acceleration sensors of different make or model.

As outlined hereabove, according to an embodiment of the present disclosure, the virtual point of view of the user is additionally displaced in response to an acceleration of the inner ear when the absolute value of the acceleration is above a predetermined threshold 64, and is not additionally displaced otherwise. As also outlined hereabove, the absolute value of the detected acceleration can be capped to a predetermined value (not illustrated). Threshold 64 is essentially set to allow detection of most steps stepped by the user, while canceling out smaller accelerations due to other body motions such as the arms and head motion.

According to an embodiment of the present disclosure, detecting an acceleration of the inner ear of the user with a sensor comprises periodically generating samples of the output of the sensor (142 in FIG. 3). FIG. 6B illustrates fives samples 58', 58", 58'", 58"" and 58'"" generated from acceleration 58 absolute value above threshold 64.

Figure 6C:
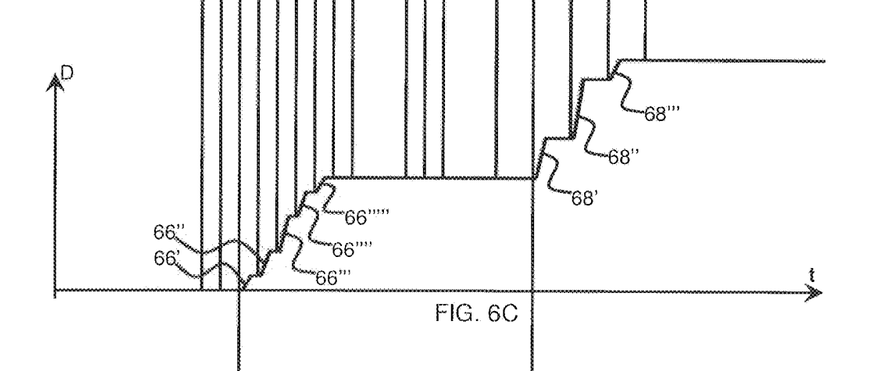

According to an embodiment of the present disclosure, the virtual point of view of the user is additionally displaced in a time equal to the sampling period by a displacement proportional to each detected absolute value sample above threshold 64. FIG. 6C illustrates the cumulative additional displacement D of the virtual point of view, starting from a reference null value, increased (see 144 in FIG. 3) by an additional displacement 66' proportional to the value of sample 58' above threshold 64 in a time equal to the sampling period between sample 58' and sample 58". According to an embodiment of the present disclosure, the additional displacement 66' can be instantaneous (like a small "teleportation") and it can take place a short while after the value of additional displacement 66' is calculated from the value of sample 58'. According to an embodiment of the present disclosure, the additional displacement 66' is completed within a time equal to the sampling period between sample 58' and sample 58". According to an embodiment of the present disclosure (not shown), the additional displacements such as additional displacement 66' can also be progressive, or linear, over time rather than being instantaneous.

FIG. 6C further illustrates additional displacement D being increased after additional displacement 66' by an additional displacement 66" proportional to the value of sample 58" above threshold 64 in a time equal to the sampling period starting from sample 58". FIG. 6C further illustrates additional displacement D being increased after additional displacement 66" by three additional displacements 66'", 66"" and 66'"" proportional respectively to the values of samples 58'", 58"" and 58'"" above threshold 64 each time in a time equal to the sampling period. FIG. 6C does not illustrate the displacements of the virtual point of view of the user that result from changes of the position of the user's head in the play area.

According to an embodiment of the present disclosure the sampling period can vary with time, for example due to the load of the calculator in charge of generating the samples. According to an embodiment of the present disclosure, when the sampling period varies in time, the additional displacement is further weighted (see 146 in FIG. 3) proportionally to the sampling period.

FIG. 6B illustrates three samples 62', 62" and 62'" generated from acceleration 62 absolute value above threshold 64 with an exemplary sampling period two times larger than the sampling period used for sampling acceleration 58 (speed factor of 2). FIG. 6C illustrates the additional displacement D of the virtual point of view, starting from the position after additional displacements 66', 66", 66'", 66"" and 66""', increased by an additional displacement 68' proportional to the value of sample 62' above threshold 64 in a time equal to the sampling period between sample 62" and sample 62", said additional displacement 68' being further weighed/given a weight proportionally to the sampling period. FIG. 6C further illustrates additional displacement D being increased after additional displacement 68' by an additional displacement 68" proportional to the value of sample 62" above threshold 64 in a time equal to the sampling period starting from sample 62", the additional displacement being weighted by the sampling period (e.g. multiplied by the ratio between the present sampling period and a default sampling period). FIG. 6C further illustrates additional displacement D being increased after additional displacement 68" by one additional displacement 68'" proportional to the value of sample 62'" above threshold 64 in a time equal to the sampling period, the additional displacement being weighted by the sampling period.

Figure 6D:
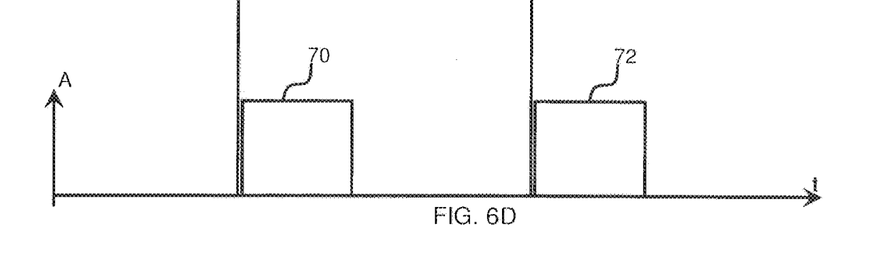

FIG. 6D illustrates that according to an embodiment of the present disclosure, the playing of an audio signal 70, 72, for example of predetermined duration, is triggered at the beginning (66', 68') of each series of additional displacements of the virtual point of view of said user in the virtual reality environment.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. A method of controlling the displacement of a virtual point of view of a user in a virtual reality environment, the method comprising:
    with a virtual reality headgear, providing a user with a virtual point of view in a virtual reality environment; and
    displacing said virtual point of view in response to a change of position of the head of the user;
    the method further comprising:
    detecting an acceleration of the inner ear of the user in a first direction; and
    if said detected acceleration of the inner ear of the user has an absolute value above a predetermined threshold, additionally displacing said virtual point of view of said user in a second direction.

2. The method of claim 1, wherein:
    said detecting an acceleration of the inner ear of the user in a first direction comprises periodically generating samples of an acceleration of the inner ear of the user in said first direction; and
    said additionally displacing said virtual point of view of said user in a second direction comprises, for each sample having an absolute value above said predetermined threshold, additionally displacing said virtual point of view in said second direction in a time equal to the sampling period by a displacement proportional to the absolute value of the sample.

3. The method of claim 2, wherein the sampling period is of 1/30th of a second or less.

4. The method of claim 2, wherein the sampling period varies in time and wherein said displacement proportional to the absolute value of the sample by which the virtual point of view of said user is displaced in said virtual reality environment is weighted proportionally to the sampling period.

5. The method of claim 1, comprising ignoring the accelerations of the inner ear of the user in said first direction if the head of the user is below a predetermined height.

6. The method of claim 1, wherein said first direction is vertical and said second direction is a horizontal direction faced by the user in said virtual reality environment.

7. The method of claim 6, comprising measuring said accelerations of the inner ear of the user in said first direction with a vertical acceleration sensor in said headgear.

8. The method of claim 1, wherein said acceleration of the inner ear of the user in a first direction is a rotational acceleration of the inner ear around a vertical axis; and said second direction is a horizontal direction faced by the user in said virtual reality environment.

9. The method of claim 8, comprising measuring said accelerations of the inner ear of the user in said first direction with a rotational acceleration sensor attached to the torso of the user.

10. The method of claim 1, comprising triggering the playing of an audio signal at the beginning of each displacement of said virtual point of view of said user in said virtual reality environment.

11. A virtual reality user interface comprising:
    a virtual reality headgear, providing a user with a virtual point of view in a virtual reality environment and displacing said virtual point of view in response to a change of position of the head of the user;

a sensor for detecting a vertical acceleration of the headgear; and a processor arranged for additionally displacing said virtual point of view of said user in a horizontal direction facing the virtual point of view if said detected vertical acceleration of the headgear has an absolute value above a predetermined threshold.

12. The virtual reality interface of claim 11, wherein said processor:

periodically generates samples of said vertical acceleration detected by the sensor; and additionally displaces said virtual point of view of said user in said horizontal direction by, for each sample having an absolute value above said predetermined threshold, additionally displacing said virtual point of view in said horizontal direction in a time equal to the sampling period by a displacement proportional to said absolute value.

13. The virtual reality user interface of claim 12, wherein the sampling period varies in time and wherein said displacement proportional to said absolute value is further weighted proportionally to the sampling period.

14. The virtual reality user interface of claim 11, wherein the processor is arranged for triggering the playing of an audio signal if said detected vertical acceleration of the headgear has an absolute value above said predetermined threshold.

15. The virtual reality user interface of claim 11, wherein the processor is arranged for ignoring the vertical accelerations of the headgear if the head of the user is below a predetermined height.

16. The virtual reality user interface of claim 11, wherein the processor is arranged for capping the absolute value of the detected vertical acceleration of the headgear to a predetermined maximum.

17. A virtual reality user interface comprising:

a virtual reality headgear, providing a user with a virtual point of view in a virtual reality environment and displacing said virtual point of view in response to a change of position of the head of the user;

a sensor for detecting a rotational acceleration of the torso of the user; and a processor arranged for additionally displacing said virtual point of view of said user in a horizontal direction facing the virtual point of view if said detected rotational acceleration of the torso of the user has an absolute value above a predetermined threshold.

18. The virtual reality interface of claim 17, wherein said processor:

periodically generates samples of said rotational acceleration detected by the sensor; and additionally displaces said virtual point of view of said user in said horizontal direction by, for each sample having an absolute value above said predetermined threshold, additionally displacing said virtual point of view in said horizontal direction in a time equal to the sampling period by a displacement proportional to said absolute value.

19. The virtual reality user interface of claim 18, wherein the sampling period varies in time and wherein said displacement proportional to said absolute value is further weighted proportionally to the sampling period.

20. The virtual reality user interface of claim 17, wherein the processor is arranged for triggering the playing of an audio signal if said detected rotational acceleration of the torso has an absolute value above said predetermined threshold.

21. The virtual reality user interface of claim 17, wherein the processor is arranged for ignoring the rotational accelerations of the torso if the head of the user is below a predetermined height.

22. The virtual reality user interface of claim 17, wherein the processor is arranged for capping the absolute value of the detected rotational acceleration of the torso to a predetermined maximum.

* * * * *